US 6,658,963 B2

(12) United States Patent
Yaddehige (10) Patent No.: US 6,658,963 B2
(45) Date of Patent: Dec. 9, 2003

(54) PEDAL MECHANISM

(75) Inventor: Sena Yaddehige, Guernsey (GB)

(73) Assignee: Caithness Development Limited, Guernsey (GB)

( * ) Notice: Subject to any disclaimer, the term of this patent is extended or adjusted under 35 U.S.C. 154(b) by 0 days.

(21) Appl. No.: 09/842,940

(22) Filed: Apr. 26, 2001

(65) Prior Publication Data

US 2002/0002873 A1 Jan. 10, 2002

(30) Foreign Application Priority Data

Apr. 27, 2000 (GB) .............................. 0010116

(51) Int. Cl.$^7$ ................................ G05G 1/14
(52) U.S. Cl. ................ 74/512; 74/560; 74/473.16
(58) Field of Search .................. 74/512, 513, 560, 74/473.16, 478

(56) References Cited

U.S. PATENT DOCUMENTS

| | | | | |
|---|---|---|---|---|
| 4,574,757 A | * | 3/1986 | Schulman et al. | 123/396 |
| 4,976,166 A | | 12/1990 | Davis et al. | 74/512 |
| 4,977,792 A | * | 12/1990 | Nagano | 74/502.2 |
| 5,063,811 A | | 11/1991 | Smith et al. | 74/513 |
| 5,115,186 A | * | 5/1992 | Reinartz et al. | 188/1.11 E |
| 5,133,225 A | * | 7/1992 | Lundberg et al. | 200/61.89 |
| 5,507,201 A | | 4/1996 | Fairbairn et al. | 74/513 |
| 5,819,593 A | | 10/1998 | Rixon et al. | 74/514 |
| 5,934,152 A | * | 8/1999 | Aschoff et al. | 123/399 |
| 5,937,707 A | * | 8/1999 | Rixon et al. | 74/512 |
| 6,070,490 A | | 6/2000 | Aschoff et al. | 74/513 |
| 6,186,025 B1 | * | 2/2001 | Engelgau et al. | 74/512 |
| 6,289,762 B1 | * | 9/2001 | Silva | 74/513 |
| 6,360,631 B1 | * | 3/2002 | Wortmann et al. | 267/209 |

FOREIGN PATENT DOCUMENTS

| | | | | |
|---|---|---|---|---|
| DE | 3411393 | 3/1984 | | 16/2 |
| DE | 3411456 | 10/1985 | | 26/4 |
| DE | 3634003 | 4/1988 | | 1/14 |
| DE | 4300096 | 7/1994 | | 26/2 |
| DE | 4426549 | 7/1994 | | 26/2 |
| DE | 4407005 | 3/1995 | | 26/2 |
| EP | 0092640 | 11/1983 | | |
| EP | 1033275 | 9/2000 | | 26/2 |
| GB | 2338774 | 12/1999 | | 1/14 |
| GB | 2339887 | 2/2000 | | 1/14 |
| WO | WO8907706 | 8/1989 | | 11/10 |
| WO | WO9104165 | 4/1991 | | 26/2 |
| WO | WO9429584 | 12/1994 | | 11/10 |

\* cited by examiner

*Primary Examiner*—David A. Bucci
*Assistant Examiner*—Timothy McAnulty
(74) *Attorney, Agent, or Firm*—Bourque & Associates, P.A.

(57) ABSTRACT

A pedal mechanism 20 requires a friction mechanism for producing the force hysteresis in the pedal to ensure the correct, desirable pedal 'feel'. A pedal arm 18 is pivoted in a housing 24. Friction is produced with a piston 28,128 which is urged by resetting springs 30,32,130,132 into frictional contact with a friction pad 36,136 which is fixed in the housing. Relative angular movement between the pedal 18 and the pad 36,136 when the pedal is depressed causes the point of contact between the pad and the piston 28 to move relative to the housing 24. This movement is resisted by friction between the pad and the piston, and by the springs which have to be compressed to allow the movement to take place. The same springs provided a restoring force to return the pedal to its initial position when it is released.

9 Claims, 8 Drawing Sheets

PEDAL MECHANISM

This invention relates to a pedal mechanism. The invention is particularly, but not exclusively, intended for use in a motor vehicle, for controlling a function of the vehicle. In particular, the pedal may be an accelerator pedal.

Although in this specification the invention is described in terms of a motor vehicle accelerator pedal, it will be appreciated that the invention may have other applications.

Accelerator pedals can be formed in one or more parts and are conventionally mounted in a floor assembly of the driver cell of a motor vehicle. The connection between an accelerator pedal and a throttle plate of a throttle mechanism is often made using a Bowden cable. The throttle plate is opened by the driver's foot pressure on the accelerator pedal. One or two resetting springs are provided to draw the accelerator pedal and thus the throttle plate back to an idling position when the driver's foot is lifted. In this way a link is provided between the pedal and throttle plate position on the one hand and a change in the engine speed on the other hand.

Due to the greater sophistication of new internal combustion engines, there is an increasing need to supply electronic engine systems with an electronic signal representing accelerator position. It is known to cause pedal movement to be converted into an electronic engine management signal. This is often referred to as 'drive-by-wire'. However in order to produce the correct 'feel' which the driver is used to experience through the foot when driving a car with a Bowden cable linkage, it is necessary to produce, in a drive-by-wire system, a resistance to pedal movement which simulates the resistance and the same driving conditions which would have been produced using a cable linkage system.

Pedal mechanisms are known wherein the friction force is produced by means of separate pretensioned friction elements (e.g. DE 3 411 456 C2). Arrangements of this kind are complicated in construction and limiting for the size of the friction force. It is also important that if one spring breaks then a satisfactory and safe resetting must be possible. The safe resetting in the event of a spring breaking is an absolute necessity for reasons of product liability and is a legal requirement in the USA through safety standard FMVSS124.

There are already several proposals (e.g. DE 3 411 393 A1; EP A 0 092 640; WO A 89/07706; WO A 91/04165) where additional friction, spring and connecting elements are provided to produce the friction.

An arrangement is known from the German Patent Application DE 4 407 005 C1 where the friction is produced by pretensioning a friction mechanism through reset springs. A complicated large-scale transfer mechanism is used here and a radially displaceable wedge-shaped friction element is used to produce friction on a lever rigidly coupled to the pedal axis.

This arrangement requires several parts movable relative to each other and cannot be integrated in the pedal structure as a result of the large installation space required.

The present invention seeks to provide a pedal mechanism which transfers the pedal position simply and precisely to, for example, an electronic engine control unit whilst the driving feel remains unchanged compared to that of a conventional foot pedal connected via a Bowden cable.

According to the invention, there is provided a pedal mechanism comprising a pedal arm mounted on a base for rotation about a pivot axis, a cylinder fixed to the arm and open at one end, a piston slideable inside the cylinder and projecting through the open end of the cylinder into frictional contact with a surface of the base and means for biasing the piston in a direction towards the open end of the cylinder, the position of the piston and cylinder relative to the pivot axis being such that as the pedal arm rotates about the pivot axis, the piston is moved either into the cylinder by pressure between the piston and the surface of the base or out of the cylinder by the biasing means, to provide a resistance to rotational movement of the pedal in one rotational direction, and a restoring force assisting rotational movement of the pedal in the other rotational direction.

The pedal mechanism can be used in a motor vehicle. When the pedal arm is depressed by a driver's foot, the angular movement of the pedal arm will cause the point where the piston makes contact with the base to move relative to the base, producing a frictional force that can be felt by the driver.

The mechanism preferably includes a position sensor for sensing the angular position of the pedal arm and for sending a position signal to an engine management system controlling the power output of the vehicle engine.

In a preferred embodiment, the position where the piston makes contact with the surface of the base is enclosed within the base. The base can be a substantially enclosed housing with an opening through which the pedal arm projects into the housing. The pivot axis is preferably contained within the housing. Surfaces on the arm and adjacent surfaces of the housing can combine to form a labyrinth seal which allows relative movement between the arm and the base but hinders the ingress of foreign matter into the housing. These surfaces which combine to form a labyrinth seal can also form stops to limit pivoting movement of the arm relative to the base.

Preferably, the cylinder will be formed integrally with the pedal arm. The pedal arm can be moulded of plastics material and the cylinder can be formed as part of the moulding. The base may also be formed from moulded plastics material.

The pedal mechanism with the position sensor can be arranged such that the pedal is urged by the biasing means towards the end of its travel corresponding to the idle position, so that when the driver's foot is released from the pedal, the pedal returns to the idle position.

The piston preferably has a friction modifying surface where it makes contact with the base, and/or the base has a friction modifying surface where it makes contact with the piston.

The biasing means will preferably comprise at least one helical compression spring compressed between the base of the cylinder and the piston. Preferably, the biasing means will comprise two helical springs of different diameters with one spring fitted inside the other.

One end of the biasing springs will preferably be located within an annular groove formed in the base of the cylinder. The other end of the springs may be located in an annular groove formed in the piston.

The end of the piston in contact with the base will preferably be rounded, so as to reduce the dependence of the contact area on the angular position of the foot pedal and to improve the uniformity of the friction. The area of the base in contact with the piston will preferably be substantially flat, normal to the plane of movement of the foot pedal. The end of the piston may be rounded so that it is rotationally symmetric about the piston axis, or may be curved in only one plane, so that the piston end is in line contact, rather than point contact, with the surface of the base.

The base may comprise a substantially enclosed housing having a first face adapted to be mounted on the floor of a motor vehicle and a second face substantially opposite to the first face. The housing also has substantially continuous surfaces connecting the first and second faces, with an opening through which the pedal enters the housing being only large enough to just permit the full range of pedal movement relative to the housing. Preferably the surface of the base with which the cylinder is in contact is on the internal side of the second face, such that the contact surfaces are remote from the floor of the vehicle. In this way, the possibility of dust ingress or fouling by applied oil sprays or the like is minimized.

End stops for pedal arm movement may be mounted on the base, the end stops cooperating with a part of the pedal arm which lies on the opposite side of the pedal arm axis to the foot pad. The end stops may be formed with an elastic noise-damping material.

Alternatively, the end stops may lie on the same side of the pedal arm axis as the foot pad, and may form a labyrinthine passage from the exterior of the housing to the interior, to reduce the possibility of foreign matter entering the housing.

The pedal position sensor can be mounted on the base and can be mounted to enable it to be rotated to set an accurate rest position.

Preferably, the cylinder will be arranged on the pedal arm such that the direction of relative movement of the piston within the cylinder is substantially tangential to an arc of travel of the pedal arm. However, the cylinder may be arranged such that the piston is oriented on the pedal arm to within 60 degrees of the tangential direction.

The pedal mechanism may be specifically adapted to function as an accelerator or a brake pedal mechanism, for a motor vehicle. If the pedal and the housing/base are moulded from plastics material the mechanism can be very light in weight, in comparison with prior art mechanisms which are generally made (at least in part) in metal.

It may be desirable to provide a 'kick-down' function in which, towards the end of pedal travel, there is a substantially increased resistance to further pedal movement which can be overcome by substantially increased pressure from the driver's foot.

To achieve this functionality, the end of the cylinder which makes contact with the base may meet a step on the base, and the cylinder is able to ride over this step, but only on application of a substantially greater force. In a further improvement, the cylinder may carry, near its end in contact with the base, a roller which is free to roll relative to the cylinder about an axis parallel to the pivot axis of the pedal, with this roller being out of contact with the base surface during normal angular movement, but making contact with, and riding over the step, at the end of travel to provided an increased pedal resistance to the last part of the pedal travel.

It will be understood that the piston and cylinder need not be of circular cross section, and may for example be generally rectangular in cross section.

The invention also provides a pedal mechanism comprising a pedal arm mounted on a base for rotation about a pivot axis, a friction surface on the base and a friction surface mounted on the pedal arm, the friction surfaces being arranged so that they move over one another as the pedal arm pivots about its pivot axis to provide a resistance to pivoting movement in one direction and a restoring force assisting pedal movement in an opposite direction, wherein the friction surfaces are biased against one another by a spring mounted on the arm.

The invention will now be further described, by way of example, with reference to the accompanying drawings, in which.

The drawings show accelerator pedal mechanisms with a position sensor for controlling the power of a vehicle engine, which could be an electric, diesel or petrol engine. The invention is not however limited to accelerator pedal mechanisms.

Figures 1, 2, 2A:
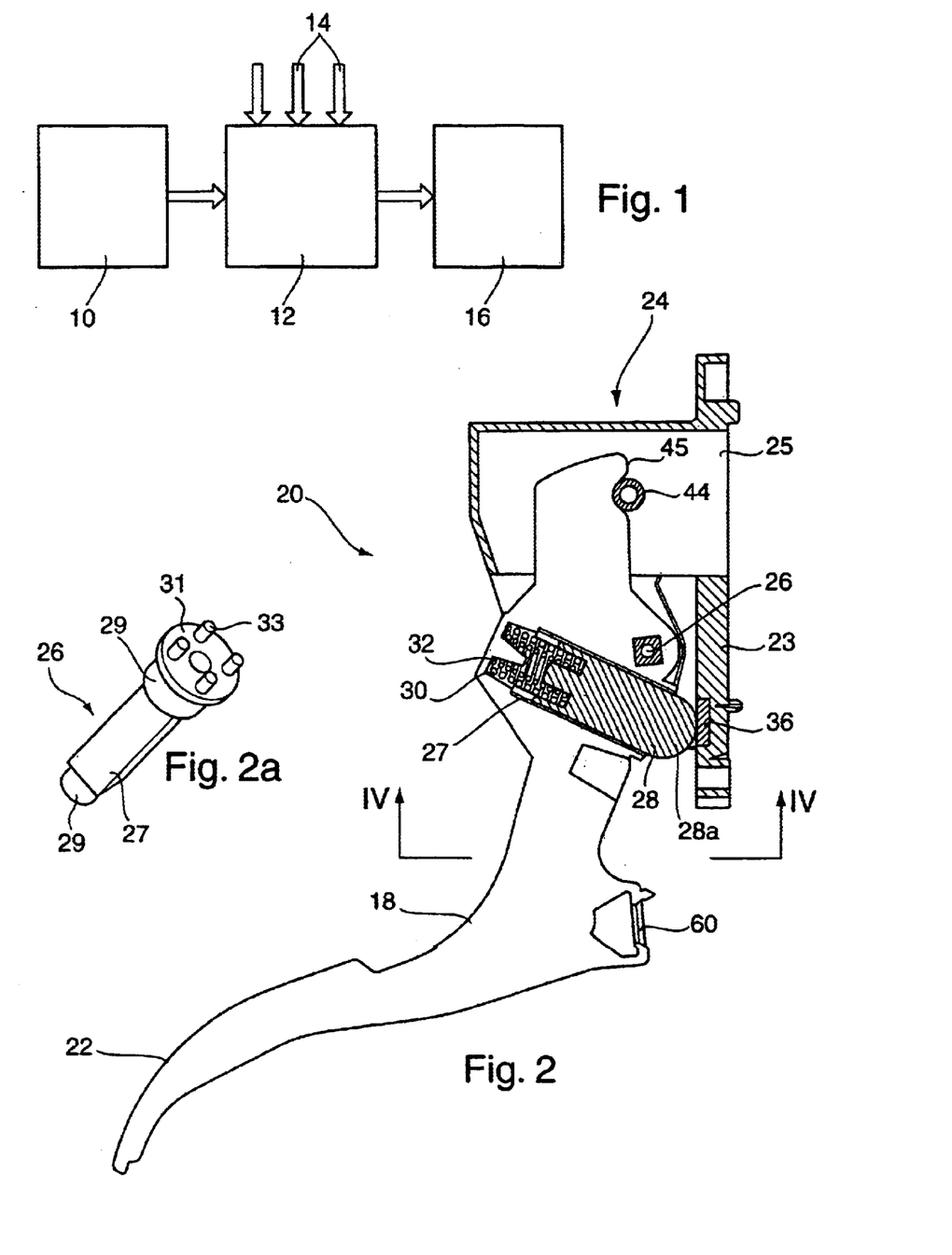
FIG. 1 is a block diagram showing a control system in which a pedal according to the invention can be used as an accelerator pedal.
FIG. 2 is a cross-section through a first embodiment of pedal mechanism in accordance with the invention, in the idle position.
FIG. 2a is a detail view of a pedal spindle.

FIG. 1 shows a possible control system for controlling a vehicle engine. The block 10 represents a sensor module which senses the pedal position of a pedal mechanism and generates a signal representing pedal position. This signal is passed to an engine control module 12 which also receives other signals 14 from sensors representing relevant parameters, such as engine coolant temperature, ambient temperature and manifold vacuum. The module 12 evaluates all these signals and then produces an output signal which is fed to a throttle valve unit 16, or to a fuel injection pump in the case of a diesel engine.

FIGS. 2 to 10 show three different embodiments of pedal mechanism 20,120,220. The mechanisms each support a sensor module 10 (see FIG. 5) suitable for use with the control system of FIG. 1.

Figures 3, 5:
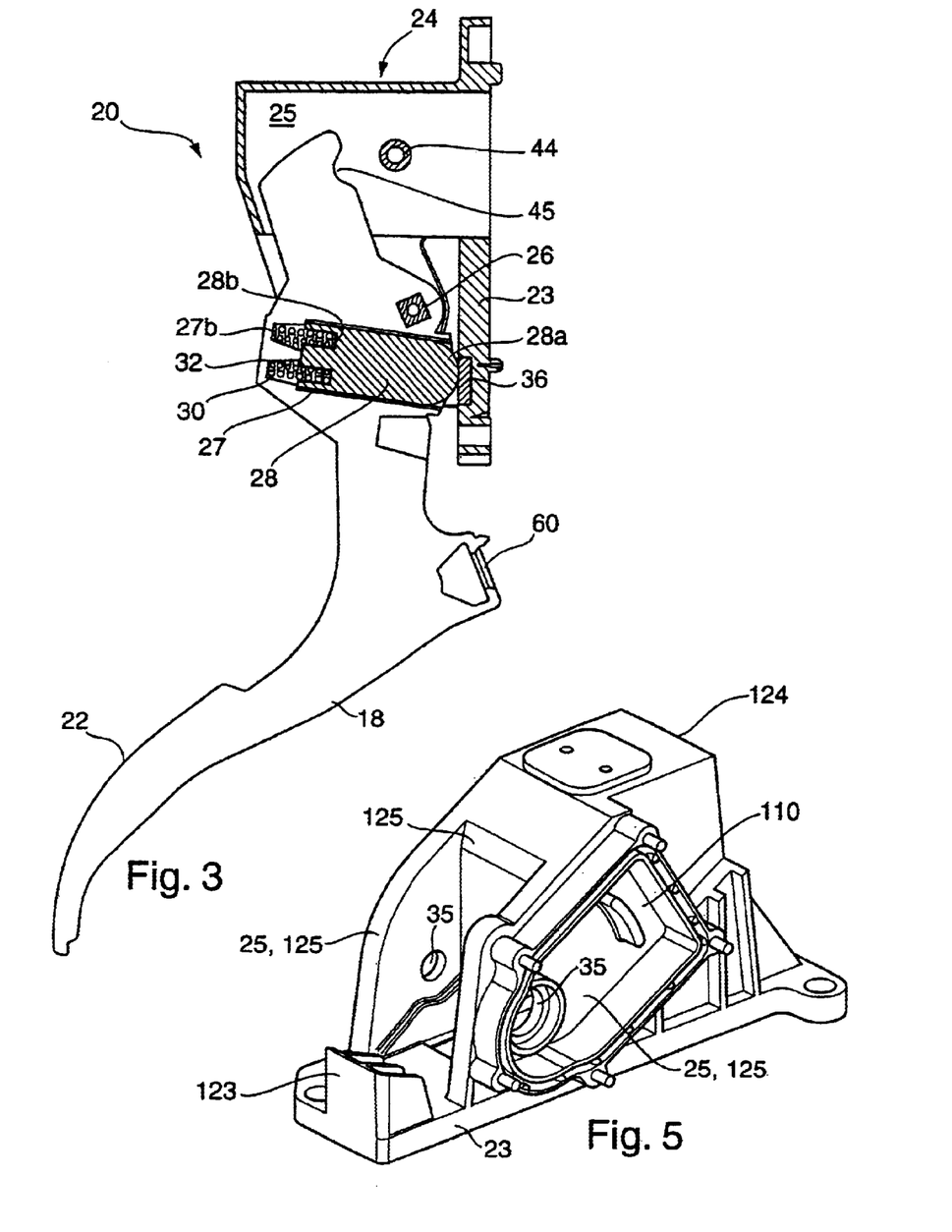
FIG. 3 is a cross-section corresponding to FIG. 2, but showing the pedal in the wide open throttle position; and, FIG. 4 is a cross-section through a second embodiment of pedal mechanism in accordance with the invention, in the idle position.
FIG. 5 is a perspective view of the pedal housing.

The pedal mechanism 20 of FIGS. 2 and 3 has a pedal arm 18 which is mounted at one end in a housing 24 in order to pivot about a pedal spindle 26. The spindle 26 (see FIG. 2a) has a square section portion 27 which is received in a square section bore 37 (see for example FIG. 4a) and circular bearing portions 29 which are received in circular bearing sockets 35 in the side walls of the housing. At one end, the spindle has a head 31 with projecting, off-centre, pins 33 and a sensor wiper arm will be secured to these pins. As a result of this construction, as the pedal is pivoted about its axis, the spindle will turn in the bearing sockets 35 and the wiper arm will move relative to a fixed part of the sensor by a distance proportional to the angular movement of the pedal arm.

A pedal 22 is provided at the other end of the pedal arm 18 for contact with a driver's foot. The housing 24 has a base 23 which, in use, will be permanently mounted on the floor of a vehicle and which has oppositely facing upstanding walls 25, between which the pedal arm 18 is pivotally mounted.

The pedal arm 18 has a socket in the form of an open-ended cylinder 27 in which there is located a piston 28. The piston 28 can move in and out of the cylinder 27, along the cylinder axis. One end portion (referred to here as the friction member) 28a of the piston 28 projects to a point outside the cylinder and makes contact with a friction surface on the base 23 whilst the opposite end (referred to as the back end) 28b of the piston 28 always remains in the cylinder 27.

A resetting element in the form of a pair of helical compression springs 30,32 is mounted between the inner end of the cylinder 27 and the back end 28b of the piston 28. The helical springs have different diameters, and are nested one inside the other. Two springs are used, so that even if one fails, the function will still be performed by the other. One end of the springs is located in an annular groove 27b formed in the inner end of the cylinder 27, whilst the other end of the springs is located in a corresponding annular groove in the back end 28b of the piston.

The helical springs 30,32 are always in compression between the back end 28b of the piston and the inner end of the cylinder and thereby bias the front end 28a of the piston 28 into contact with the base 23, so that the pedal arm 18 is always urged in the direction of the rest or idle position of FIG. 2.

When the pedal arm is depressed by the driver's foot the angular movement of the pedal arm 18 towards the base plate 23 causes the piston 28 to move further into the cylinder 27, thereby further compressing the springs 30,32. The pedal can be moved to any position between the 'idle' position shown in FIG. 2 and the 'full gas' position shown in FIG. 3. During angular movement of the pedal arm, relative sliding movement takes place between the piston end 28a and the base 23 which, in conjunction with the bias provided by the reset springs 30,32, produces a frictional force which will be felt as a resistance by the driver, when the pedal arm is depressed.

In the region where the piston 28 makes contact with the base 23, the base 23 has a friction surface 36, formed from a material which is chosen to produce, in conjunction with a friction surface on the front end of the piston, a desired frictional force which will be felt by the driver when the pedal arm is depressed.

A stop 44 is provided between the upstanding walls 25 of the housing to limit the angular movement of the pedal 18. When the pedal 18 is released from the full gas position of FIG. 3 and reaches the idle position shown in FIG. 2, the stop 44 locates in a groove 45 of the pedal arm 18, thereby preventing any further clockwise angular movement of the pedal 18. The stop 44,45 is located on the side of the pedal spindle 26 opposite to the pedal 22.

The pedal mechanism 20 is assembled by inserting the springs 30,32 into the cylinder 27 in the pedal arm 18 so that they fit within the annular groove 27b, inserting the piston 18 into the cylinder 27 and fitting the pedal arm between the upstanding walls 25 of the housing 24. (A snap fit mechanism may be provided to prevent the piston 28 from falling out of the cylinder 27 whilst the pedal mechanism 20 is being assembled). The square section hole 37 in the pedal arm 18 is then lined up with the holes 35 in the side walls 25, and the spindle 26 is pushed into place through the holes to act as a bearing. To do this will require some compression of the springs 30,32, but the pedal mechanism 20 can be assembled in this way simply and without any tools.

A kick-down switch of a known type can be fitted in a socket 60 on the arm 18, to make contact with the vehicle floor when the pedal is pressed fully down.

FIGS. 4, 5, 6 and 7 show a second embodiment in which the orientation of the piston/cylinder arrangement is reversed. In this embodiment, parts which correspond to parts already described with reference to FIGS. 2 to 4 carry the same reference numerals increased by 100.

Figure 4:
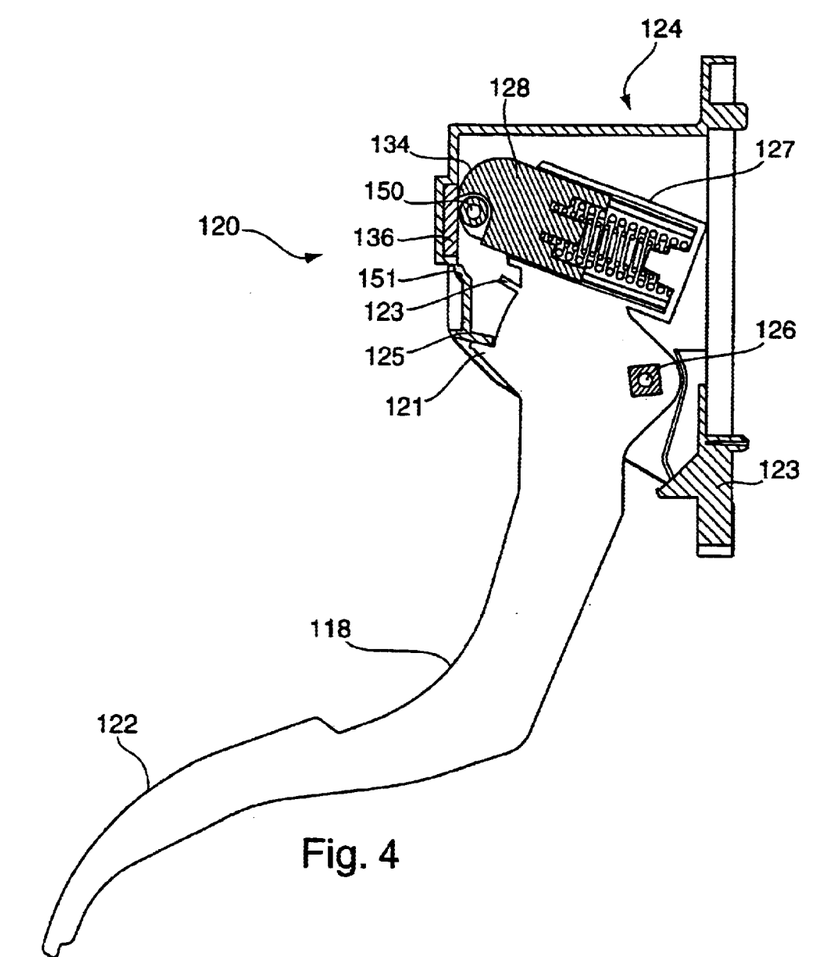
Figure 4A:
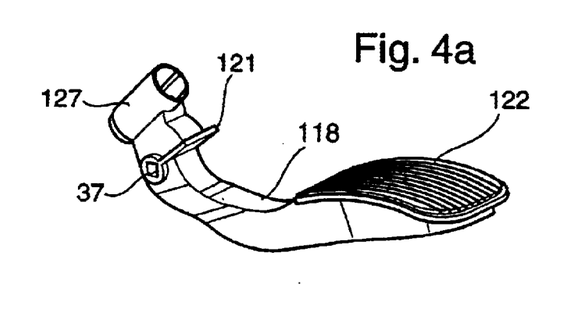
FIG. 4a is a perspective view of the pedal arm of FIG. 4, separated from the remaining components of the mechanism.

FIG. 4 shows that the outer end 134 of the piston 128 now bears against a friction pad 136 arranged on a surface of the housing 124 which is opposite to the base 123. The contact surface between the piston and the pad is thus concealed within the housing and is less liable to pick up dirt or be covered in oil than is the case with the first embodiment.

Furthermore, the upper surface 119 of the arm 118 is provided with walls 121 and 123 which extend parallel to the pivot axis 126 of the pedal and co-operate with an inwardly extending wall 125 on the housing to form a labyrinth type seal to protect the interior of the housing 124 against the ingress of dirt or other substances which could affect the sliding contact between the piston 127 and the friction pad 136.

The walls 121, 123 and 125 also cooperate to form end stops limiting pivoting movement of the pedal arm to the desired angular range. As this limit has to be accurate, and reliable over long periods in service, one of the abutting faces may be provided with projecting ribs against which the other surface will make contact. The presence of ribs helps to prevent the end stop position from being affected by foreign matter being trapped between the faces.

FIG. 5 shows the housing 124 with a socket 110 for receiving a separate sensor which will have a wiper arm connected to the spindle 26. The construction of this sensor forms no part of the present invention, and a sensor which interfaces with pedal movement by means of something other than a wiper arm is also within the scope of the invention.

Apart from the reversal of the piston and cylinder, and the features just described, the construction and manner of operation are very similar to those described with reference to FIGS. 2 and 3.

However this second embodiment, as shown in the drawings, does possess one other new feature.

Figure 6:
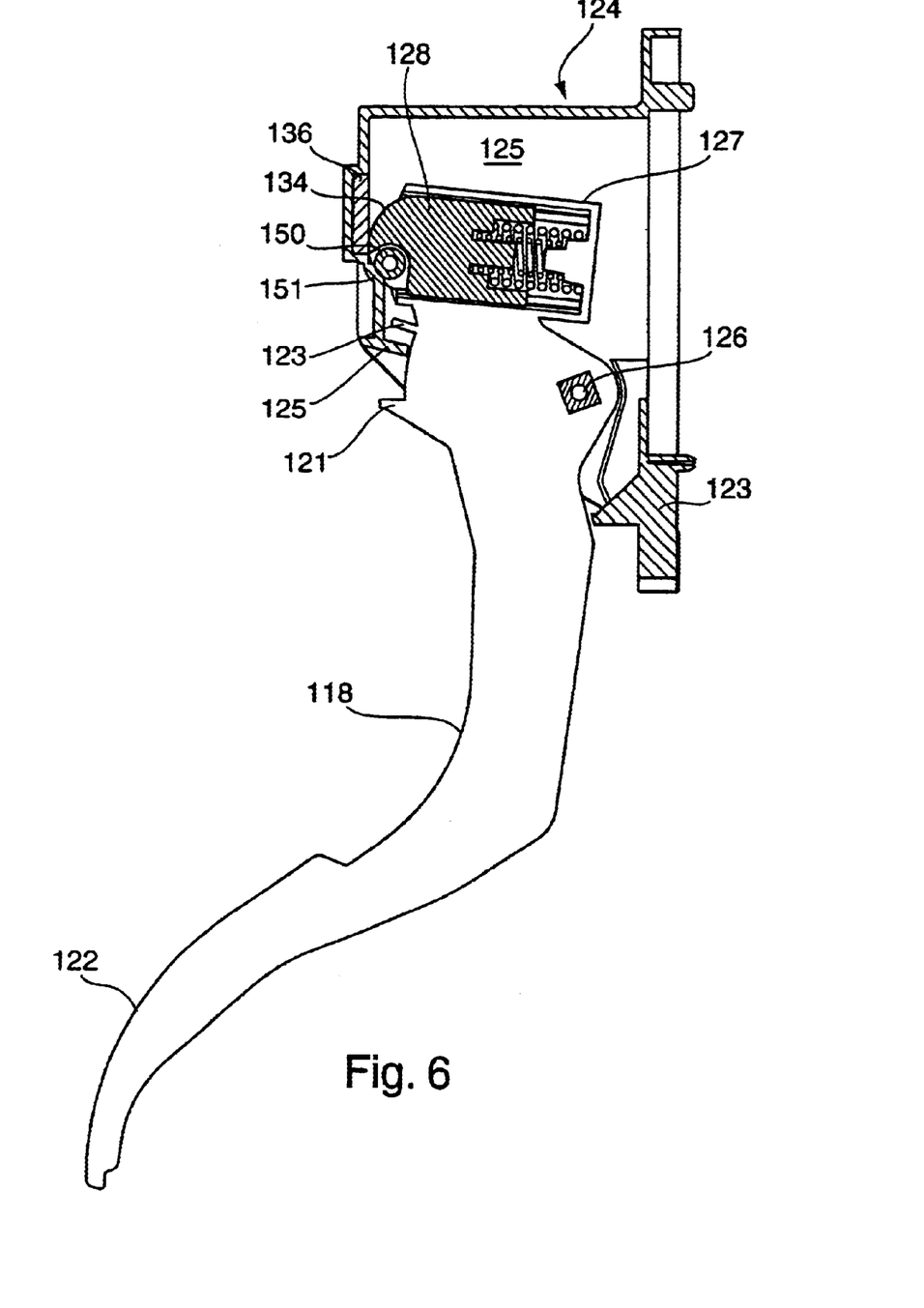
FIG. 6 is a cross-section corresponding to FIG. 4, but showing the pedal in the wide open throttle or full gas position.
Figures 7, 8:
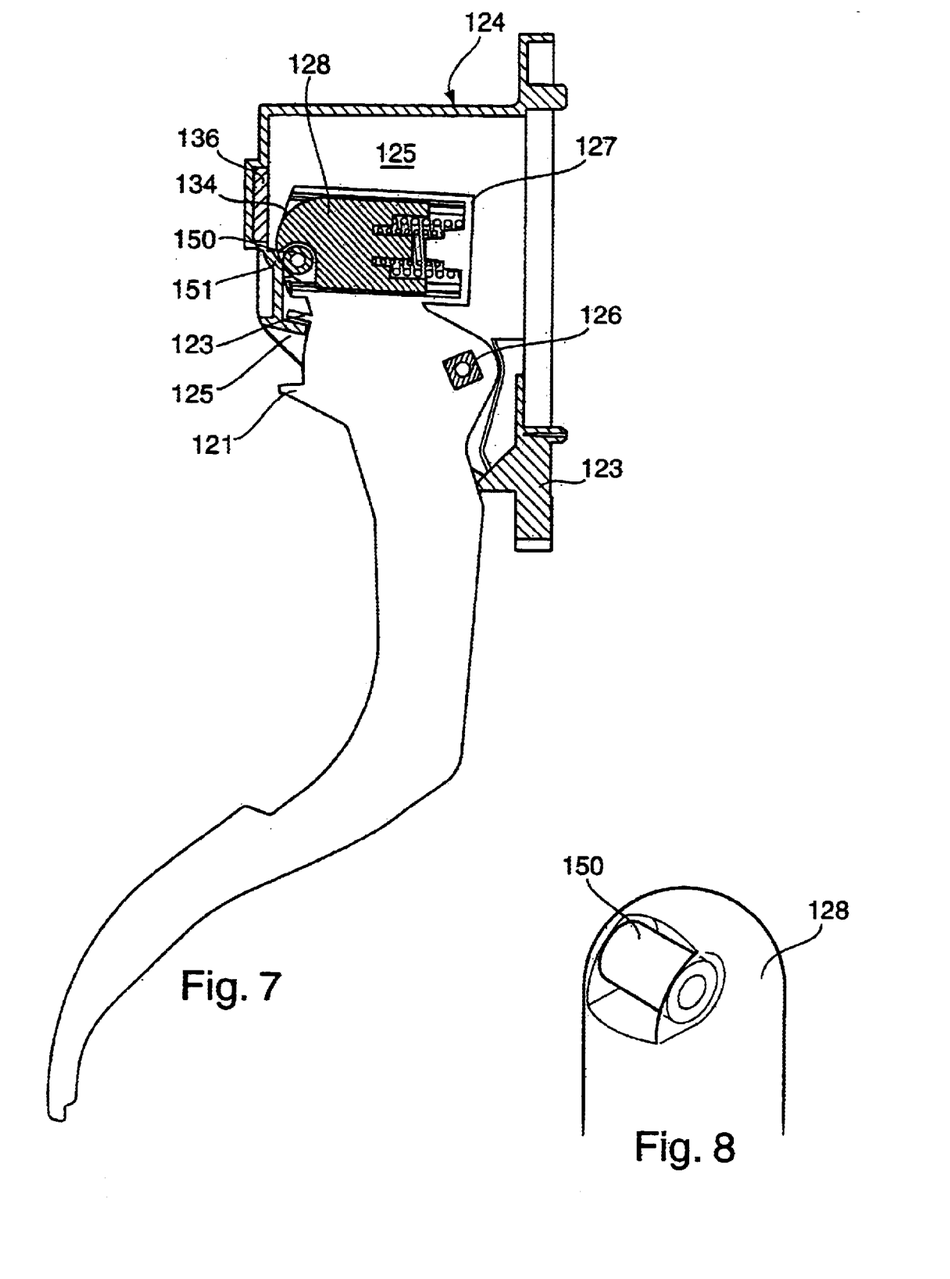
FIG. 7 is a cross-section corresponding to FIG. 6, but showing the pedal in the kick-down position.
FIG. 8 is a perspective view of a piston which forms part of the second embodiment.

The piston 128 carries a small roller 150 inset into the head of the piston—see also FIG. 8. Whilst the pedal is working between idle (FIG. 5) and full gas (FIG. 6), this roller is out of contact with any other surface and plays no part in operation. The roller does however play a part in providing a simulated 'kick down' feature whereby movement of the pedal arm beyond the full gas position can be achieved, against a substantially increased driver effort.

The inner surface of the top wall of the housing 124 has a step 151. As can be seen in FIG. 6, in the full gas position the roller comes up against this step, and the driver feels that the pedal has reached the end of its travel. However when further pressure is applied to the pedal, the roller will begin to ride over the step (see FIG. 7) and in doing so the piston 128 will be pushed further back into the cylinder 128. The roller 150 will be mounted on an axle 152 in the piston 128 and will rotate on this axis during this short further movement.

It will be appreciated that the presence of the roller 150 is not essential to providing the 'kick-down' feature. Suitable shaping of the end of the cylinder and the step 151 could do the same job. However the use of the roller 150 results in smoother operation.

The sensor 10 will be set to signal that this extra movement has taken place, and the engine set up can interpret this movement in any way which the engine strategy designer wishes.

In some applications, a 'kick-down' feature is not required, and then the roller 150 and its seat in the piston head can be omitted.

The pedal mechanism is shown fitted with two helical or coil compression springs 30,32. Springs of this kind can be made cost-effectively and with great precision. In conjunction with the generation of friction through the relative movement of friction surfaces 34 and 36, it is possible to produce a pedal operating force and pedal friction with very great precision without additional pretensioning elements and without the need for an adjustment. This is very advantageous for large scale mass production. With a view to the rising demands for comfort in the automotive industry this design of pedal mechanism offers through the optimum design of the driver/vehicle interface with regard to the ergonomic design and behaviour of the pedal considerable advantages over the prior art, where the friction is generally produced with additional friction and pretensioning elements, and thus has great tolerances.

Figure 9:
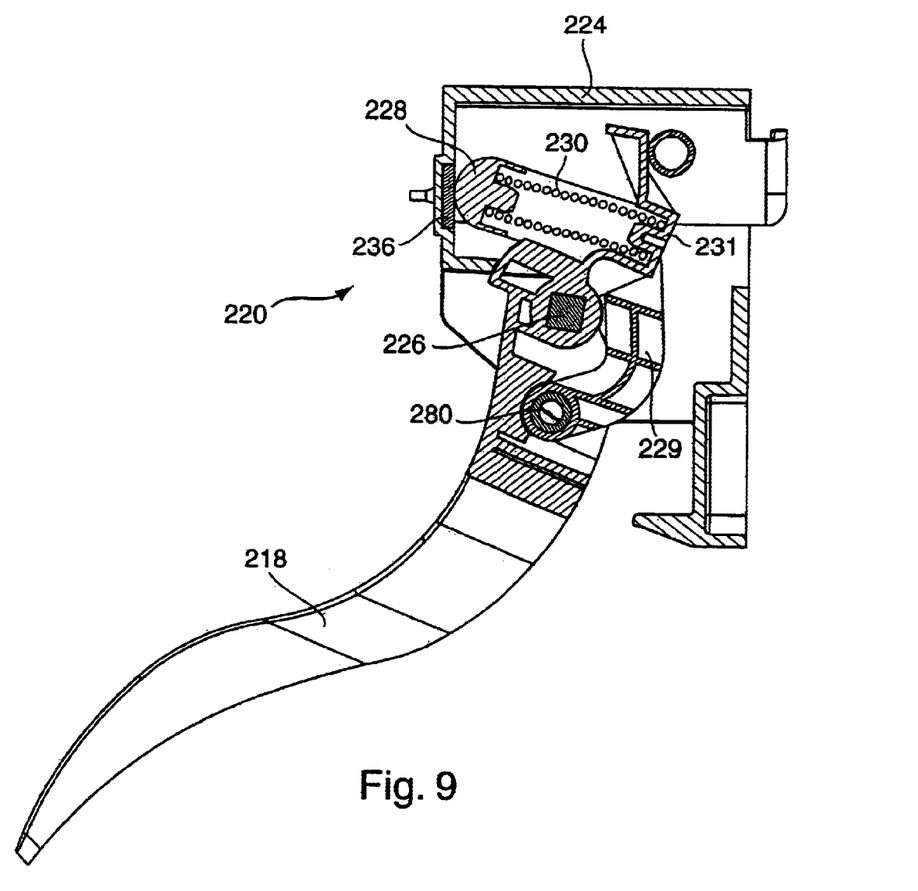
FIG. 9 is a cross-section through a third embodiment of pedal mechanism in accordance with the invention, in the idle position.
Figure 10:
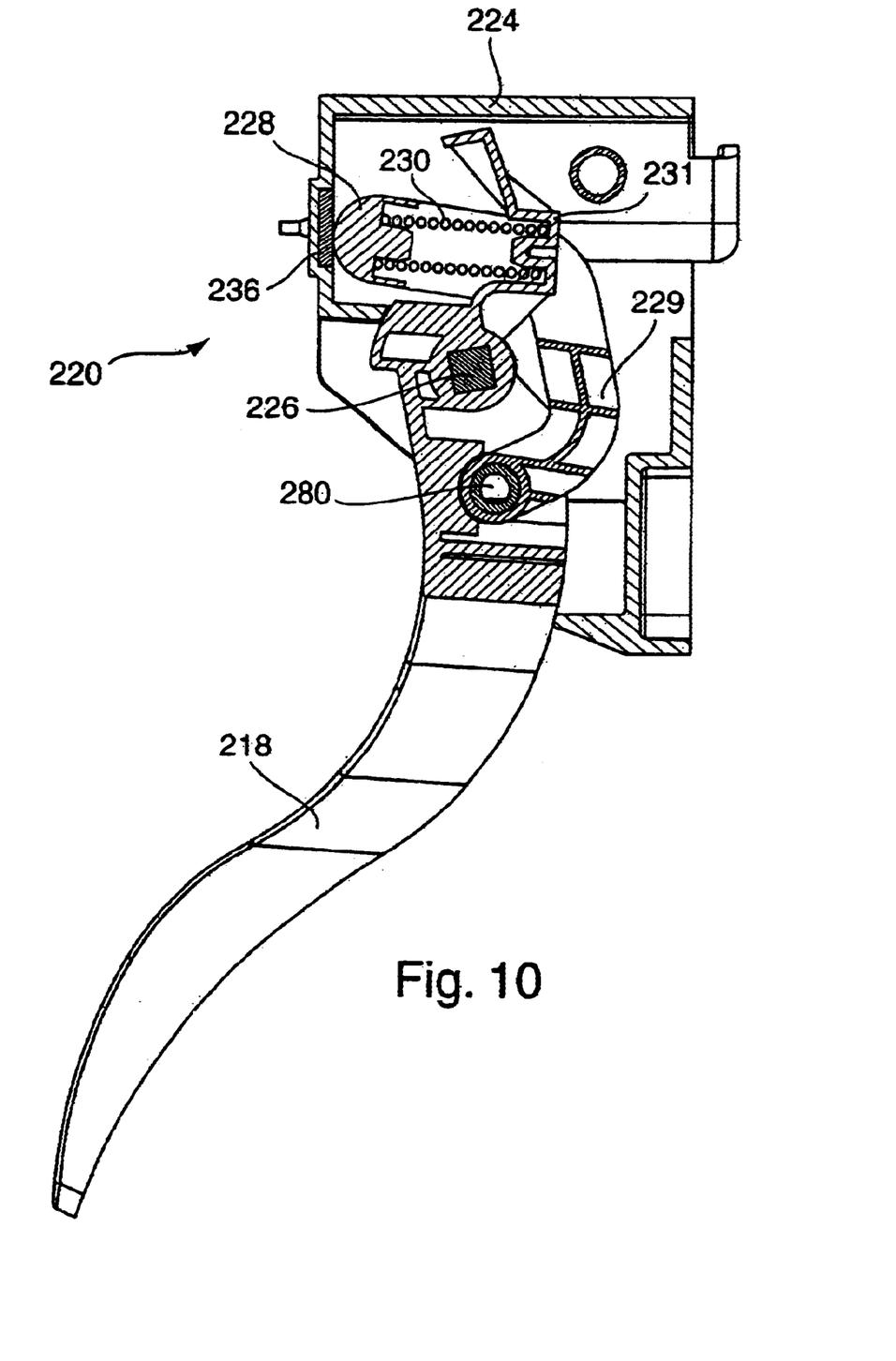
FIG. 10 is a cross-section corresponding to FIG. 9, but showing the pedal in the wide open throttle or full gas position.

FIGS. 9 and 10 show a third embodiment. In place of the piston/cylinder arrangement shown in FIGS. 2 to 8, the friction member is in the form of a button 228 on the end of a lever 229 pivoted on the pedal arm on an axis 280 spaced from the axis 226, for rotation with the pedal arm 218. A spring 230 acts between the lever 229 and a spring seat 231 on the pedal arm 218 and biases the button 228 against a friction surface 236 on the housing 224.

When the pedal is depressed, the distance between the axis 280 and the contact point 228/236 will change, and as a result, the button 228 will be forced to move across the friction surface 236, and friction will be produced resisting the pedal movement. At the same time, energy will be stored in the spring 230 to restore the pedal to its idle position. The spring 230 will thus be compressed during pedal movement and will store a restoring force which will return the pedal to the idle position when the drive removes his foot from the pedal.

The pedal 22 and pedal arm 18 can have a lattice plastics construction. Such a design of the pedal structure allows an extremely stiff structure which is lightweight and suited to plastics. A glass reinforced polymer such as a polyamide is particularly suitable. The weight of this structure can amount to about 250 g. Comparable structures with steel pedal and adapted pedal sensor which are generally used nowadays are significantly heavier and on average weigh more than 1500 g.

By applying a specific friction lining to the surfaces 34,36, ie the contact faces between the piston and the base, it is readily possible through a corresponding choice of material to adapt the friction values and thus the friction force. Since the friction lining 36 in the base plate 23 has a small area and a small volume and does not have to absorb pedal forces, relatively expensive friction-modified special plastics can be used here which are best suited for this use and guarantee a defined quiet stick-slip-free friction which is constant throughout the service life and requires no lubrication.

One significant advantage of the invention is that the force required to hold the pedal in a set position is less than that required to move the pedal to that position. In other words, there is a hysteresis curve which the pedal follows in moving from idle to full gas and back again. As a result, driving for long periods with constant or substantially constant pedal position is less tiring than with a system without hysteresis.

Figure 11:
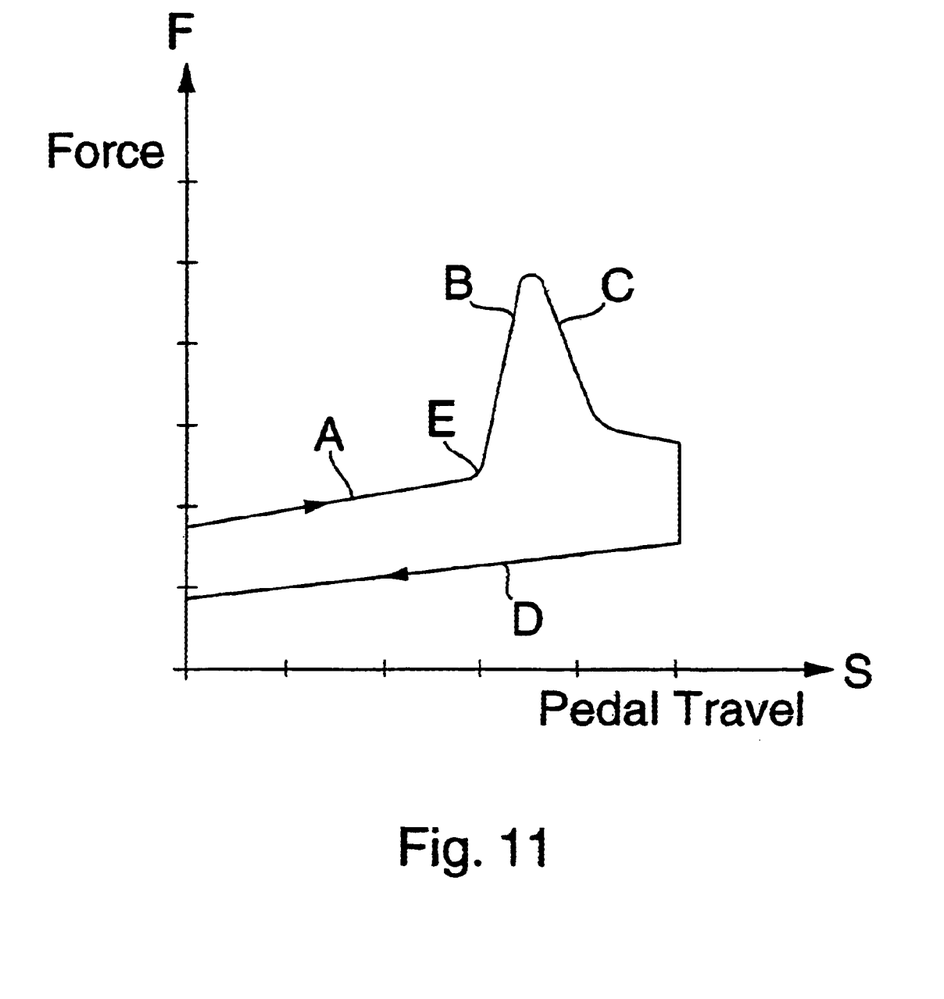
FIG. 11 is a graph of pedal force against pedal travel.

The hysteresis curve is shown in FIG. 11. Starting from rest, initial application of force to the pedal results in pedal movement and this is represented by the line section A. At the point B, the end of normal travel/beginning of kick-down is reached. A much higher force is then applied (at C) to produce further movement of the pedal, but once the step 151 is overcome, the force required to move the pedal to its limit is reduced (D).

Return travel of the pedal takes place following the line E, and it will be seen that the force required to hold the pedal in a particular position is very much less than that required to bring it to that position.

The resetting elements are illustrated in the figures by two coil compression springs 30,32. They can be made cost-effectively with high precision. When designed in stainless valve spring steel (as is preferred), calculation and construction for permanent strength are possible without problem.

The position sensor 10 is for reasons of bearing precision and standardization formed as a separate component part with its own bearing and its own housing. It is screwed by means of screws onto correspondingly formed screw-on dome covers of the assembly base and is adjusted through screw-on flange bores formed as oblong holes in the rest position to an accurately specified starting signal through turning and then screw-tightening. The mechanical transfer of the pedal travel by the position sensor may take place through a conventional lever mechanism or spur wheel gearing. Preferably however a wiper contact within the sensor is directly coupled to the pedal axis (through the pins 31), for rotation with the pedal about the axis.

For the ergonomic foot operation it is necessary that the pedal travel of the pedal mechanism is not too great since otherwise for full throttle the foot moves into an unacceptably tiring stretched position or the heel of the foot has to be moved each time between idling and full load position. Thus a small pedal travel is required for the ergonomic foot design. On the other hand too small a pedal travel, particularly in the case of high performance vehicles, leads to poor throttling of the vehicle power. Many experiments have shown that a pedal travel of about 50 mm from idling to full load represents the best possible compromise between throttle control and pedal ergonomy. This means that an ideal pedal mechanism must have low tolerances for the pedal travel since otherwise the throttling or pedal ergonomy is negatively affected. The design of the pedal mechanism according to the invention therefore has the idling stop and full load stop integrated into the pedal mechanism.

Since the accelerator pedal represents a safety-critical structural group it immediately follows from this that the pedal mechanism including its housing structure in the vehicle must have a very high rigidity and the load boundaries have to be clearly proved through calculation and guaranteed through precision defined processes in production.

As it will be appreciated from the above description of the pedal mechanism, the resetting force of the resetting elements is used directly to produce the friction force. Furthermore, the pedal bearings are precise with neutral wear and able to be manufactured cost-effectively. The unavoidable wear to the friction faces producing the pedal friction required for reasons of comfort does not change the play or accuracy of the pedal mechanism throughout its service life.

The pedal mechanism described offers good 'feel' to the driver, together with low cost, low weight and accurate reliable performance.

What is claimed is:

1. A pedal mechanism comprising a pedal arm mounted on a base for rotation about a pivot axis, and a friction mechanism mounted between the pedal arm and the base for resisting movement about the pivot axis in one rotational direction and for assisting movement in the other rotational direction, the friction mechanism comprising: a friction member on the pedal arm, and a friction surface mounted on the base, the friction member being biased into contact with the friction surface and being mounted on the pedal arm for movement across the friction surface against the biasing force, wherein the friction member comprises a cylinder open at one end, a piston slideable inside the cylinder and projecting through the open end of the cylinder into frictional contact with a friction surface on the base, and means for biasing the piston in a direction towards the friction surface, the position of the piston and cylinder relative to the pivot axis being such that as the pedal arm rotates about the pivot axis, the piston is moved either into the cylinder by pressure between the piston and the surface of the base or out of the cylinder by the biasing means, to provide a resistance to rotational movement of the pedal in one rotational direction, and a restoring force assisting rotational movement of the pedal in the other rotational direction.

2. A pedal mechanism as claimed in claim 1, wherein the mechanism is mounted on the opposite side of the pivot axis to the pedal on the pedal arm.

3. A pedal mechanism as claimed in claim 1, wherein the position where the piston makes contact with the surface of the base is enclosed within the base.

4. A pedal mechanism as claimed in claim 1, wherein the end of the piston in contact with the base is rounded.

5. A pedal mechanism as claimed in claim 1, wherein the cylinder is arranged on the pedal arm such that the direction of relative movement of the piston within the cylinder is substantially tangential to the of travel of the pedal arm.

6. A pedal mechanism as claimed in claim 1, wherein the cylinder is formed integrally with the pedal arm.

7. A pedal mechanism as claimed in claim 1, wherein the pedal arm is a plastics moulding, and the cylinder is an integral part of the plastics moulding.

8. A pedal mechanism as claimed in claim 7, wherein the base is also a plastics moulding.

9. A pedal mechanism as claimed in claim 8, wherein the base includes a moulded-in insert of a different, low-friction material.

* * * * *